United States Patent
Pujari et al.

(10) Patent No.: US 11,812,296 B2
(45) Date of Patent: Nov. 7, 2023

(54) MEASUREMENT PRUNING BASED ON USER EQUIPMENT (UE) SUPPORTED FREQUENCY BAND COMBINATIONS

(71) Applicant: QUALCOMM Incorporated, San Diego, CA (US)

(72) Inventors: Sarath Kumar Pujari, Hyderabad (IN); Ansah Ahmed Sheik, Hyderabad (IN); Hitesh Jain, Udaipur (IN)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/350,587

(22) Filed: Jun. 17, 2021

(65) Prior Publication Data
US 2022/0408290 A1 Dec. 22, 2022

(51) Int. Cl.
*H04W 24/10* (2009.01)
*H04W 8/24* (2009.01)
*H04W 72/0453* (2023.01)

(52) U.S. Cl.
CPC ............ *H04W 24/10* (2013.01); *H04W 8/24* (2013.01); *H04W 72/0453* (2013.01)

(58) Field of Classification Search
CPC ................................ H04W 24/10; H04W 8/24
See application file for complete search history.

(56) References Cited

U.S. PATENT DOCUMENTS

| | | | |
|---|---|---|---|
| 11,323,924 B1* | 5/2022 | Marupaduga | H04W 36/0058 |
| 11,553,365 B2* | 1/2023 | Kim | H04W 76/27 |
| 2014/0335880 A1* | 11/2014 | Lindoff | H04B 17/327 |
| | | | 455/452.1 |
| 2015/0289189 A1* | 10/2015 | Yang | H04W 36/30 |
| | | | 455/437 |
| 2016/0057685 A1* | 2/2016 | Yang | H04W 48/16 |
| | | | 455/436 |
| 2016/0338133 A1* | 11/2016 | Lee | H04W 72/12 |
| 2018/0287870 A1* | 10/2018 | Yerramalli | H04L 5/0064 |
| 2020/0162932 A1* | 5/2020 | Futaki | H04W 16/14 |
| 2020/0396633 A1* | 12/2020 | Tseng | H04W 76/27 |
| 2022/0132356 A1* | 4/2022 | Jung | H04W 24/10 |

* cited by examiner

*Primary Examiner* — Zhiren Qin
(74) *Attorney, Agent, or Firm* — Loza & Loza, LLP

(57) ABSTRACT

The aspects described herein are directed to an apparatus supporting a combination of frequency bands including a first frequency band associated with a primary cell (PCell) and at least a second frequency band associated with a secondary cell (SCell). The apparatus may prune out measurements of frequency bands associated with the SCell, where the frequency bands associated with the SCell may not be supported or deployed at the apparatus when the PCell is too weak. The apparatus measures the first frequency band associated with the PCell and measures the second frequency band associated with the SCell if the measurement of the first frequency band is greater than or equal to a threshold. The apparatus transmits a report including at least the measurement of the first frequency band.

20 Claims, 10 Drawing Sheets

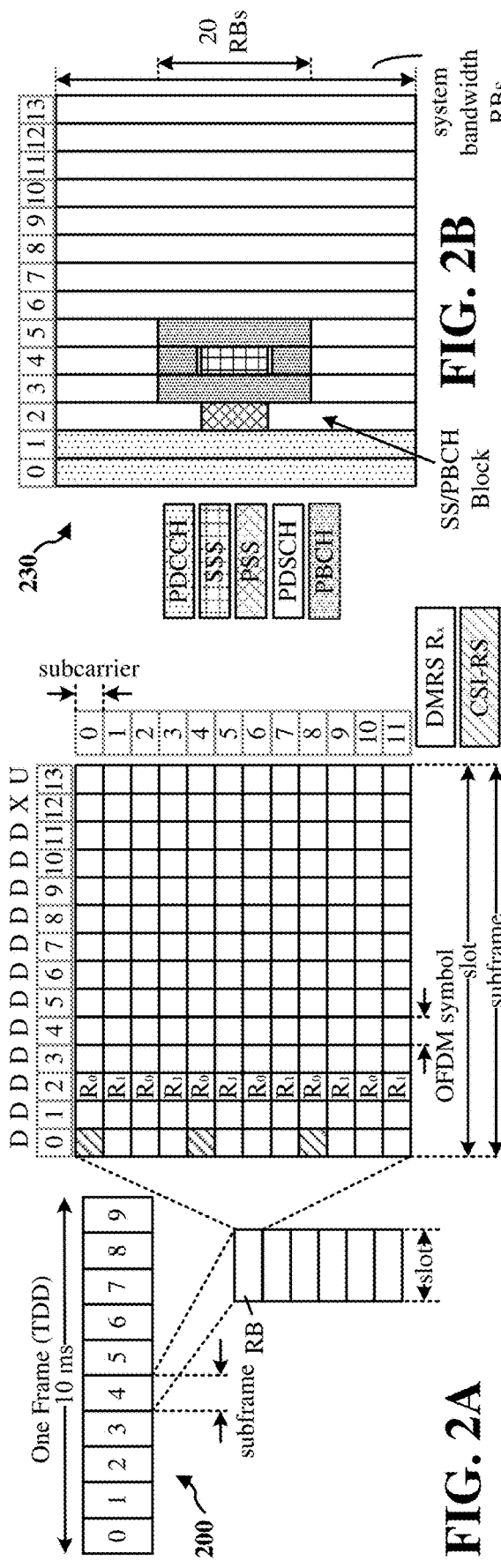
FIG. 2A
FIG. 2B
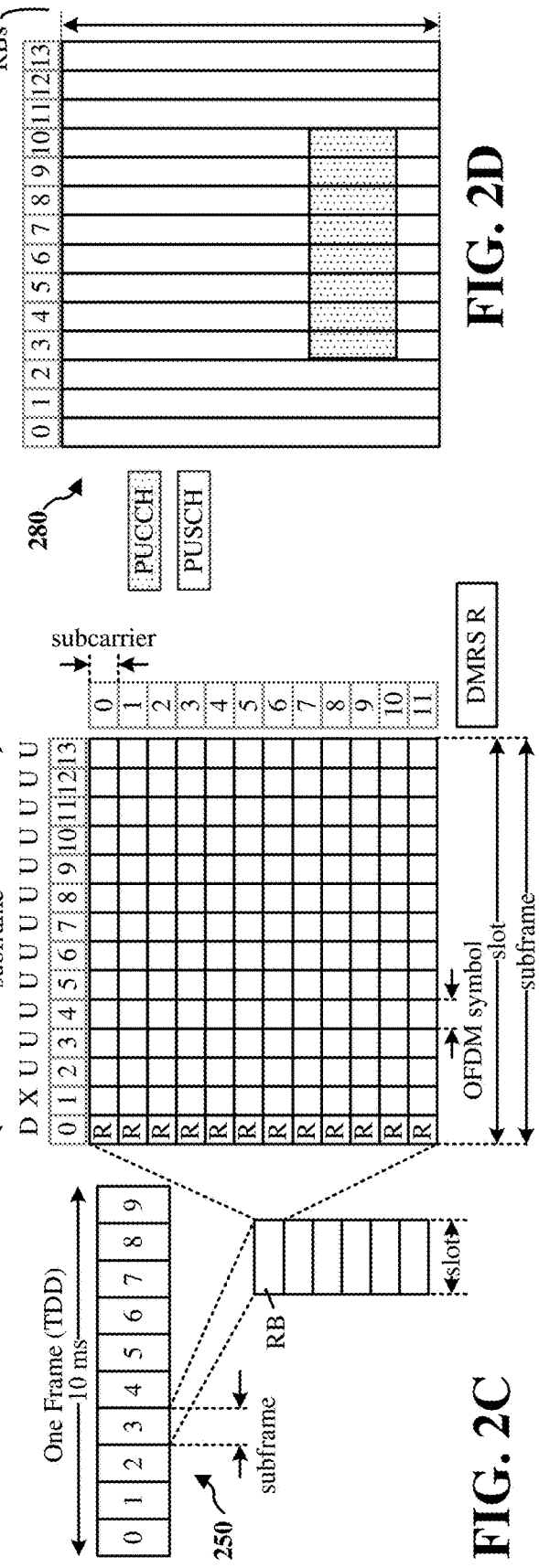
FIG. 2C
FIG. 2D

MEASUREMENT PRUNING BASED ON USER EQUIPMENT (UE) SUPPORTED FREQUENCY BAND COMBINATIONS

BACKGROUND

Technical Field

The present disclosure relates generally to communication systems, and more particularly, to measurement pruning based on user equipment (UE) supported frequency band combinations.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A network may configure a user equipment (UE) to measure frequency bands of a primary cell (PCell) and a secondary cell (SCell) and to report the measurements to the network. However, the UE may be unable to deploy certain PCell and SCell frequency band combinations when the frequency band of the Pcell in a frequency band combination is too weak. As a result, the UE may consume power and resources measuring frequency bands of SCells that may not be of any practical use. The aspects described herein may overcome these issues.

For example, the aspects described herein are directed to an apparatus supporting a combination of frequency bands including a first frequency band associated with a PCell and at least a second frequency band associated with an SCell. The apparatus may prune out measurements of frequency bands associated with an SCell, where the frequency bands associated with the SCell may not be supported at the apparatus when the anchor frequency band of the PCell is too weak.

In an aspect of the disclosure, a method, a computer-readable medium, and an apparatus are provided. The apparatus may support a combination of frequency bands including a first frequency band associated with a primary cell and at least a second frequency band associated with a secondary cell. The apparatus measures the first frequency band associated with the primary cell. The apparatus measures the second frequency band associated with the secondary cell if the measurement of the first frequency band is greater than or equal to a threshold. The apparatus transmits a report including at least the measurement of the first frequency band.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
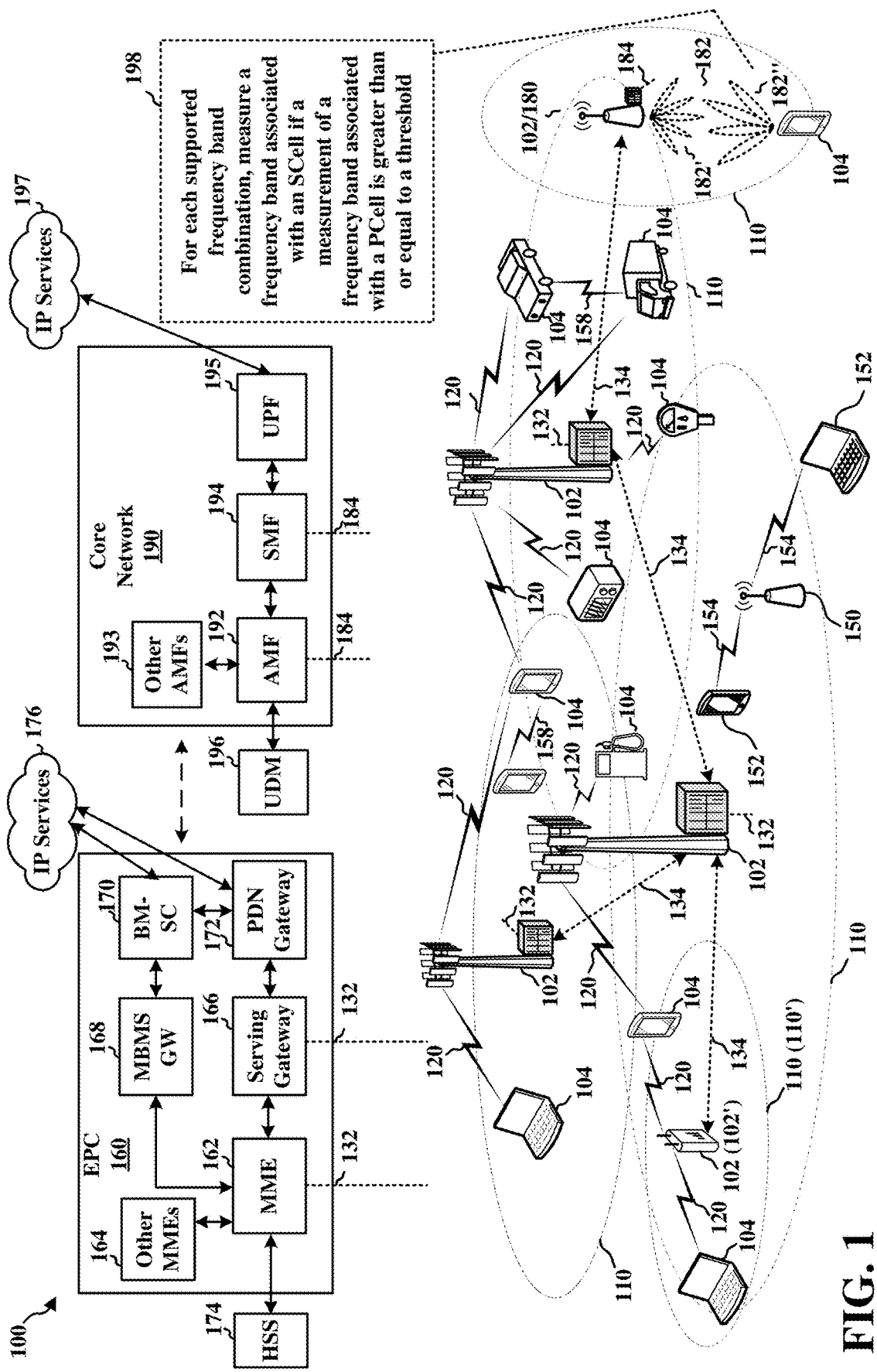
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Y×MHz (xcomponent carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to, for each supported frequency band combination at the UE 104, measure a frequency band associated with an SCell if a measurement of a frequency band associated with a PCell is greater than or equal to a threshold (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
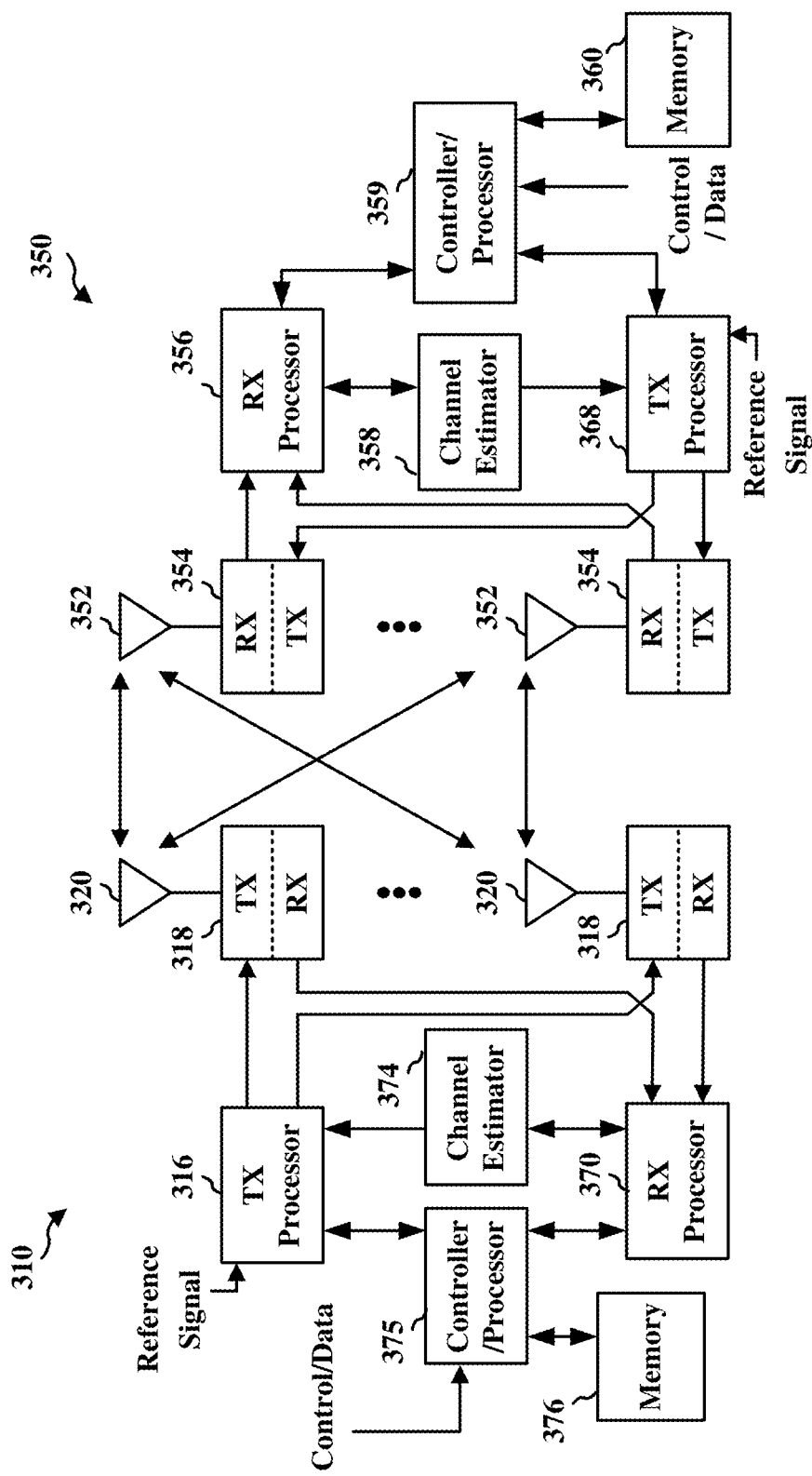
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
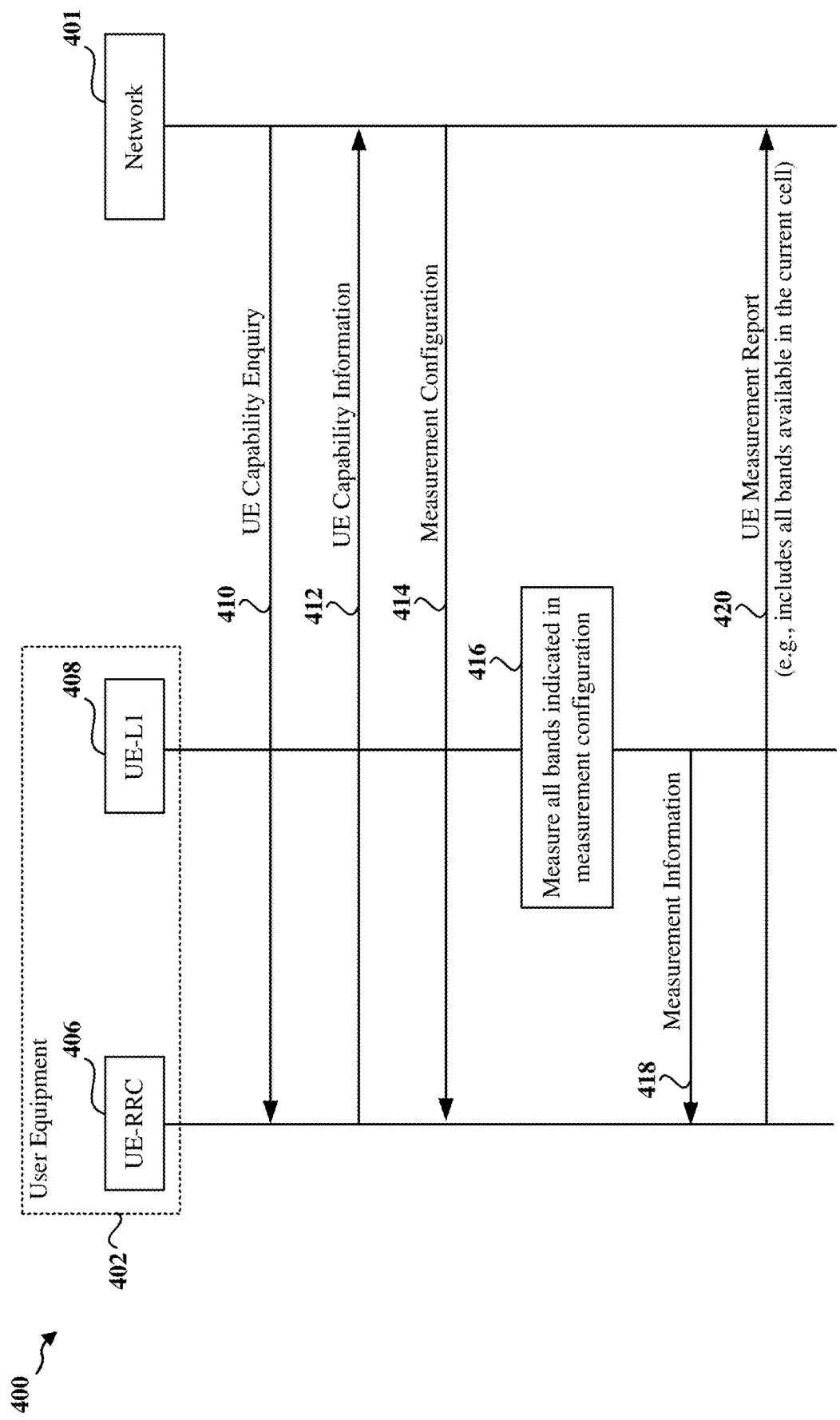
FIG. 4 illustrates a signal flow diagram including a UE and a network.

FIG. 4 illustrates a signal flow diagram 400 including a user equipment (UE) 402 and a network 401. The UE 402 may implement a layer 3 entity, such as a radio resource control (RRC) layer entity 406 (also referred to as UE-RRC 406), and a layer 1 (L1) entity, such as a physical layer entity 408 (also referred to as UE-L1 408). In some examples, the network 401 may include multiple base stations and may support multiple radio access technologies (RATs).

As shown in FIG. 4, the network 401 may transmit a UE capability enquiry message 410 to obtain information about the capabilities of the UE 402. The UE capability enquiry message 410 may include a list of frequency bands to allow the network 401 to obtain the capabilities of the UE 402 with respect to those frequency bands.

The UE 402 may transmit a UE capability information message 412 in response to the UE capability enquiry message 410. The UE capability information message 412 may indicate one or more frequency bands and/or one or more frequency band combinations supported at the UE 402.

The network 401 may transmit a measurement configuration message 414 to the UE 402 in response to the UE capability information message 412. The measurement configuration message 414 may indicate one or more frequency bands to be measured at the UE 402. In some examples, the network 401 may configure the UE 402 to measure all frequency bands common to both the frequency bands indicated in the UE capability information message 412 and the frequency bands supported at the cell on which the UE 402 is currently camping on.

At 416, the UE-RRC 406 may configure a lower layer, such as the UE-L1 408, to measure all the bands indicated in the measurement configuration message 414. The UE-L1 408 may provide a measurement information message 418 to the UE-RRC 406 including the measurements obtained at 416. The UE 402 may transmit a UE measurement report 420 including measurements for all the frequency bands available in the current cell to the network 401.

In some scenarios, however, some of the frequency bands indicated in the measurement configuration message 414 may not actually be supported at the UE 402. For example, the UE 402 may be unable to deploy certain PCell and SCell frequency band combinations where the anchor frequency band in a frequency band combination is too weak. As another example, the UE 402 may not indicate certain PCell and SCell frequency band combinations as being supported in the UE capability information message 412. As a result, the UE 402 may consume power and resources measuring frequency bands of cells (e.g., SCells) that may not be of any practical use.

Figure 5:
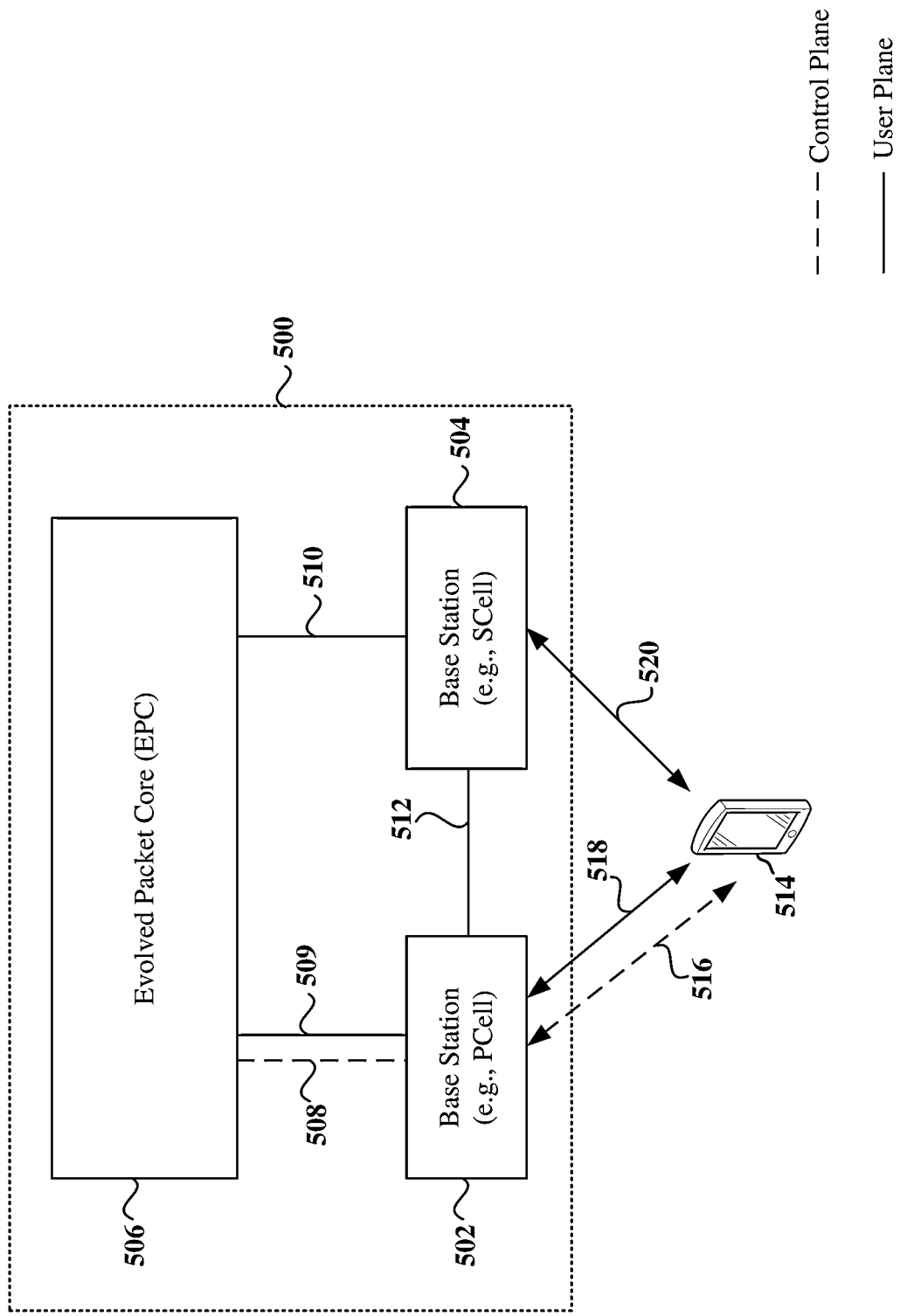
FIG. 5 illustrates an example of a 5G NR non-standalone (NSA) network.

FIG. 5 illustrates an example of a 5G NR non-standalone (NSA) network 500. A non-standalone (NSA) network may be deployed by overlaying the NR network over an existing network, such as an LTE network including an Evolved Universal Mobile Telecommunications System (UMTS) Terrestrial Radio Access (E-UTRA) air interface. The NSA network 500 may include a first base station 502 coupled to the Evolved Packet Core (EPC) 506 via a first control plane interface 508 (e.g., an S1 interface) and a first user plane interface 509 (e.g., an S1 interface). In some examples, the first base station 502 may be an eNB acting as a primary cell (PCell). The NSA network 500 may further include a second base station 504 coupled to the evolved packet core (EPC) 506 via a second user plane interface 510 (e.g., an S1 interface). In some examples, the second base station 504 may be a gNB acting as a secondary cell (SCell). The first base station 502 may be coupled to the second base station 504 via a third user plane interface 512 (e.g., an X2 interface).

In some examples, the UE 514 may support dual connectivity (DC) to simultaneously maintain connections to the first and second base stations 502, 504. In the example of FIG. 5, the UE 514 may be said to support Multi-Radio Dual Connectivity (MR-DC) because the first and second base stations 502, 504 are implementing different RATs, such as LTE and NR.

In one example, the UE 514 may first establish a connection to the first base station 502 (e.g., an eNB acting as a PCell in the LTE network) followed by a connection to the second base station 504 (e.g., a gNB acting as an SCell in the NR network). Such dual connectivity may be referred to as E-UTRA-NR Dual Connectivity (EN-DC). In this scenario, the first base station 502 may be referred to as an anchor node (also referred to as a master node) and the E-UTRA frequency bands supported by the first base station 502, such as B1 (e.g., 2100 MHz) and B3 (e.g., 1900 MHz), may serve as anchor frequency bands.

For example, an anchor frequency band may be used for control plane functionality (e.g., initial access, paging, mobility, etc.), as well as user plane functionality. In the example of FIG. 5, control plane signaling 516 (e.g., RRC signaling) and user plane signaling 518 (e.g., data traffic) between the first base station 502 and the UE 514 may be performed on E-UTRA frequency bands and user plane signaling 520 (e.g., data traffic) between the second base station 504 and the UE 514 may be performed on NR frequency bands.

Figure 6:
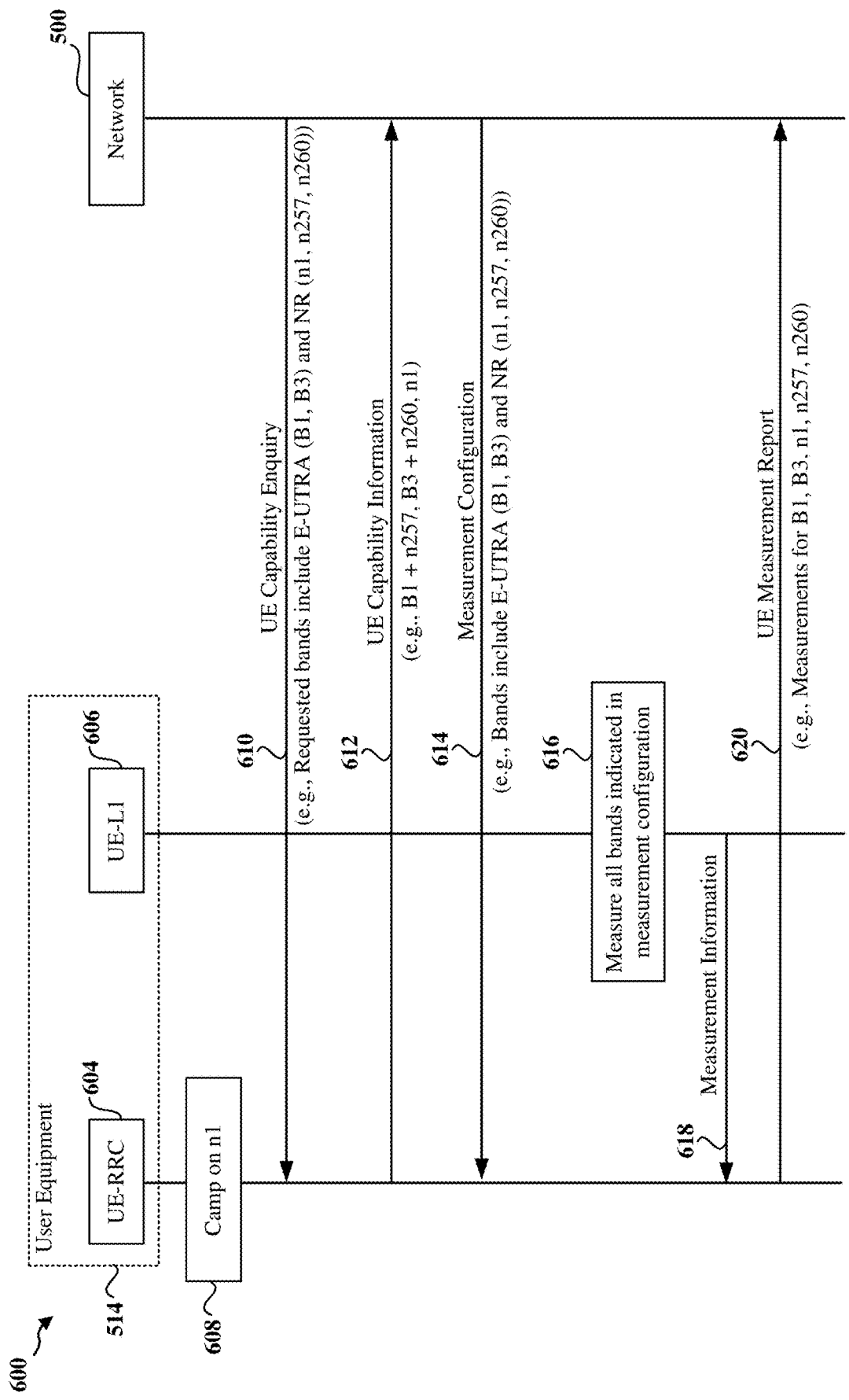
FIG. 6 illustrates a signal flow diagram including a UE and a network.

FIG. 6 illustrates a signal flow diagram 600 including the user equipment (UE) 514 and the network 500. The UE 514 may implement a layer 3 entity, such as a radio resource control (RRC) layer entity 604 (also referred to as UE-RRC 604), and a layer 1 (L1) entity, such as a physical layer entity 606 (also referred to as UE-L1 606).

At 608, the UE 514 may camp on an NR frequency band, such as the n1 frequency band. The network 500 may transmit (e.g., via the first base station 502) a UE capability enquiry message 610 to obtain information about the capabilities of the UE 514. The UE capability enquiry message 610 may include a list of frequency bands supported at the network 500, such as E-UTRA frequency bands B1 (e.g., 2100 MHz) and B3 (e.g., 1900 MHz), and NR frequency bands n1 (2100 MHz), n257 (e.g., 28 GHz), n260 (e.g., 39 GHz). In some examples, the list of frequency bands included in the UE capability enquiry message 610 may be the only frequency bands supported at the network 500.

In the example of FIG. 6, the UE 514 may have the hardware capability to support NSA frequency band combinations, such as a first NSA frequency band combination including frequency bands B1 and n257, and a second NSA frequency band combination including frequency bands B3 and n260. The UE 514 may further support NR frequency band n1. It should be understood that for a given frequency band combination, the UE 514 may not be able to support or deploy a frequency band of an SCell (e.g., an NR frequency band supported at the second base station 504) if the signal strength on the anchor frequency band of a PCell (e.g., an E-UTRA frequency band supported at the first base station 502) is too weak (e.g., below a threshold signal strength value). The UE 514 may transmit a UE capability information message 612 including the first NSA frequency band combination (e.g., B1+n257), the second NSA frequency band combination (e.g., B3+n260), and the NR frequency band n1.

In response to the UE capability information message 612, the network 500 may transmit (e.g., via the first base station 502) a measurement configuration message 614 to configure the UE 514 with measurement objects for E-UTRA frequency bands B1 and B3, and NR frequency bands n1, n257, and n260. For example, the measurement configuration message 614 may be included in an RRC connection reconfiguration message and may include at least a measurement object parameter indicating the frequency bands B1, B2, n1, n257, and n260 on which the UE 514 is to perform measurements.

In some examples, the network 500 may configure the UE 514 (e.g., via the first base station 502) to measure the frequency bands B1 and n260, and the frequency bands B3 and n257 to enable direct handover of the UE 514 to the frequency band B1 or B3 (e.g., whichever of the frequency bands B1 and B3 is stronger) and also to add an SCell on frequency band n257 or n260 (e.g., whichever of the frequency bands n257 and n260 is stronger) through one single reconfiguration. This is a typical configuration seen in IoT logs (e.g., a feature including transitioning from a standalone (SA) mode to NSA mode has already been deployed in the central unit (CU) and/or in the core and terminals (CT).

At 616, the UE-RRC 604 may configure a lower layer, such as the UE-L1 606, to measure all the bands indicated in the measurement configuration message 614. The UE-L1 606 may provide a measurement information message 618 to the UE-RRC 604 including the measurements obtained at 616. The UE 514 may transmit a UE measurement report 620 including measurements for all the bands available in the current cell to the network 500.

In one example scenario, the UE 514 may measure the anchor frequency band of a PCell and may determine that the strength measured on the frequency band of the PCell is too weak (e.g., below a threshold). For example, when the first base station 502 (e.g., an eNB) is acting as the PCell, the UE 514 may measure the anchor frequency band B1 supported at the first base station 502 and may determine that the strength measured on the frequency band B1 of the PCell is too weak (e.g., below a threshold). The UE 514 may further measure a frequency band of an SCell and may determine that the strength measured on the frequency band of the SCell is strong (e.g., above a threshold). For example, when the second base station 504 (e.g., a gNB) is acting as an SCell, the UE 514 may measure the NR frequency band n257 supported at the second base station 504 and may determine that the strength measured on the frequency band n257 of the SCell is strong (e.g., above a threshold). In this scenario, if the UE 514 supports the frequency band combination including frequency bands B1 and n257, the NR frequency band n257 may not actually be supported or deployed if the anchor frequency band B1 of the PCell is too weak. Therefore, there may be no purpose for the UE 514 to report the measurement of the NR frequency band n257 to the network 500.

Since the UE 514 may not need to report the frequency band of an SCell (e.g., the NR frequency band n257 as previously described) when the corresponding anchor frequency band of a PCell (e.g., the anchor frequency band B1) is too weak, the UE 514 may avoid measuring the frequency band of the SCell. Therefore, in some aspects of the disclosure, the UE 514 may use one or more of the supported frequency band combinations to determine whether to measure an SCell. This is further described with reference to FIG. 7.

Figure 7:
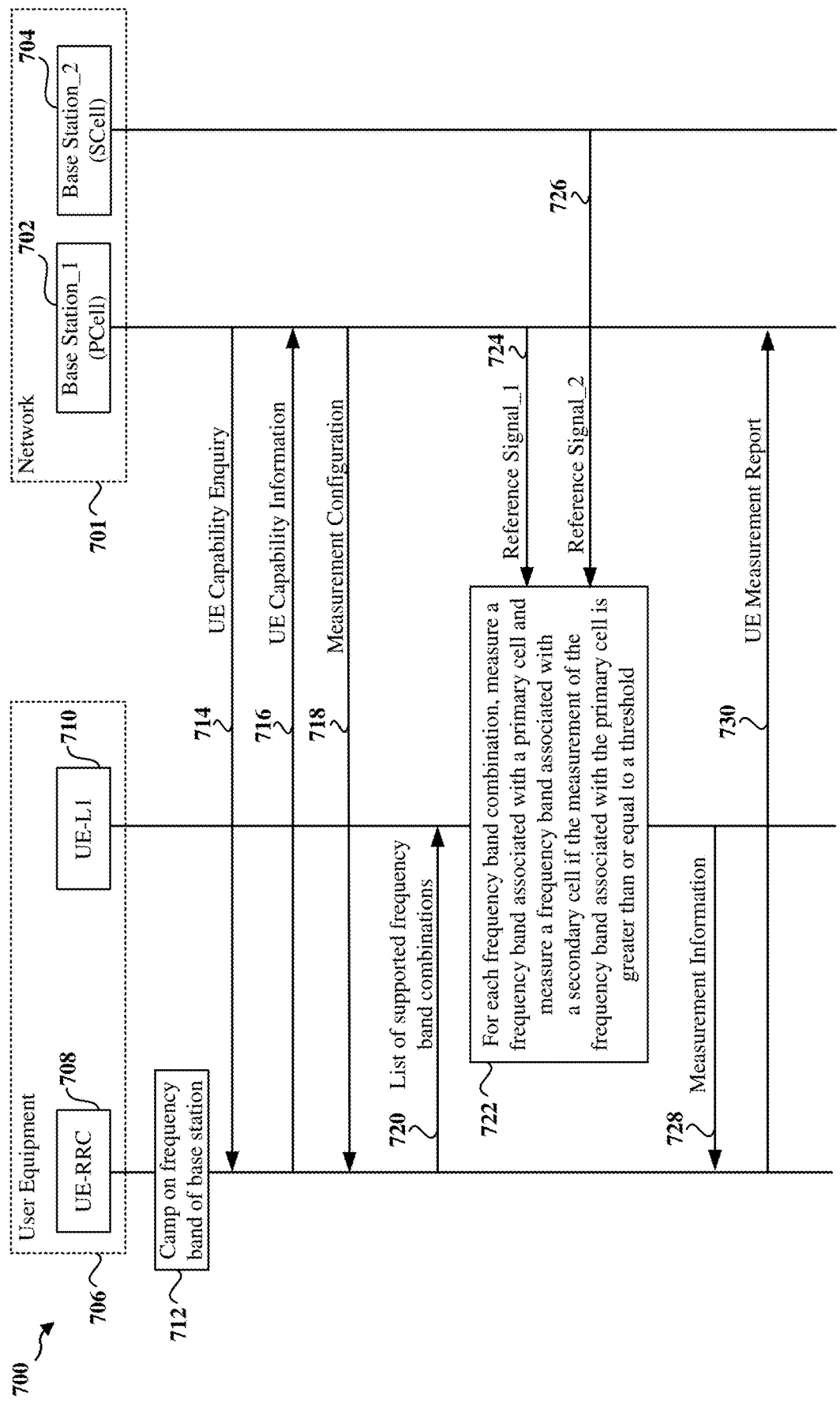
FIG. 7 illustrates a signal flow diagram including a UE and a network.

FIG. 7 illustrates a signal flow diagram 700 including a user equipment (UE) 706 and a network 701 in accordance with various aspects of the disclosure. For example, the network 701 may include a first base station 702 (e.g., referred to as Base Station_1 702 in FIG. 7) and a second base station 704 (e.g., referred to as Base Station_2 704 in FIG. 7). The UE 706 may implement a layer 3 entity, such as a radio resource control (RRC) layer entity 708 (also referred to as UE-RRC 708), and a layer 1 entity, such as a physical layer entity 710 (also referred to as UE-L1 710). In some examples, the network 701 may support multiple RATs.

In one example, the first base station 702 may support a first RAT, such as LTE, and the second base station 704 may support a second RAT, such as NR. The UE 706 may support dual connectivity (e.g., Multi-Radio Dual Connectivity (MR-DC)) to simultaneously maintain a connection to a first cell of the network 701 (e.g., the first base station 702 acting as a PCell) via the first RAT and a connection to a second cell of the network 701 (e.g., the second base station 704 acting as an SCell) via the second RAT.

In one example, the network 701 may be a 5G NR non-standalone (NSA) network as previously described with reference to the network 500 in FIG. 5. Therefore, in this example, the UE 706 may first establish a connection to the first base station 702 (e.g., an eNB acting as a PCell in an LTE network) followed by a connection to the second base station 704 (e.g., a gNB acting as an SCell in an NR network). In this scenario, the first base station 702 may be referred to as an anchor node (also referred to as a master node) and the E-UTRA frequency bands supported by the first base station 702, such as B1 (e.g., 2100 MHz) and B3 (e.g., 1900 MHz), may serve as anchor frequency bands.

At 712, the UE 706 may camp on a frequency band of a base station in the network 701. In one example, the UE 706 may camp on the frequency band n1. The first base station 702 may transmit a UE capability enquiry message 714 to obtain information about the capabilities of the UE 706. The UE capability enquiry message 714 may include a list of frequency bands to allow the network 701 to obtain the capabilities of the UE 706 with respect to those frequency bands. For example, the UE capability enquiry message 714 may indicate E-UTRA frequency bands, such as B1 (e.g., 2100 MHz) and B3 (e.g., 1900 MHz), and NR frequency bands, such as n1 (2100 MHz), n257 (e.g., 28 GHz), n260 (e.g., 39 GHz).

The UE 706 may transmit a UE capability information message 716 in response to the UE capability enquiry message 714. The UE capability information message 716 may indicate one or more frequency bands and/or one or more frequency band combinations supported at the UE 706.

In the example of FIG. 7, the UE 706 may have the hardware capability to support NSA frequency band combinations, such as a first NSA frequency band combination including frequency bands B1 and n257, and a second NSA frequency band combination including frequency bands B3 and n260. The UE 706 may further support NR frequency band n1. In this example, the E-UTRA frequency bands B1 and B3 (e.g., the anchor frequency bands) may be associated with a PCell (e.g., the first base station 702) and the NR frequency bands n257 and n260 may be associated with an SCell (e.g., the second base station 704).

It should be understood that for a given frequency band combination (e.g., an NSA frequency band combination), the UE 706 may not be able to support or deploy a frequency band of an SCell (e.g., an NR frequency band n257, n260 in the NSA configuration) if the signal strength on the anchor frequency band of a PCell (e.g., an E-UTRA frequency band supported at the first base station 702) is too weak (e.g., below a threshold, such as a threshold signal strength value) from the perspective of the UE 706. In some examples, the UE 706 may be considered out of coverage from the frequency band associated with the PCell when the measurement of the frequency band associated with the PCell is below the threshold.

The UE 706 may transmit a UE capability information message 716 including the first NSA frequency band combination (e.g., B1+n257), the second NSA frequency band combination (e.g., B3+n260), and the NR frequency band n1. In response to the UE capability information message 716, the first base station 702 may transmit a measurement configuration message 718 to configure the UE 706 with measurement objects for E-UTRA frequency bands B1 and B3, and NR frequency bands n1, n257, and n260. For example, the measurement configuration message 718 may be included in an RRC connection reconfiguration message and may include at least a measurement object parameter indicating the frequency bands B1, B2, n1, n257, and n260 on which the UE 706 is to perform measurements.

The UE-RRC 708 may provide a list of the supported frequency band combinations 720 to a lower layer, such as the UE-L1 710, and may configure the lower layer to perform measurements on frequency bands. At 722, for each frequency band combination in the list of the supported frequency band combinations 720, the UE-L1 710 may measure a frequency band associated with a PCell and may measure a frequency band associated with an SCell if the measurement of the frequency band associated with the PCell is greater than or equal to a threshold. Therefore, with respect to some aspects of the disclosure, it may be said that the UE 706 (e.g., at 722) prunes out measurements of frequency bands associated with SCells which cannot be supported or deployed when the strength of an anchor frequency band of a PCell is too weak (e.g., below a threshold).

In some examples, the UE 706 may measure a frequency band associated with the PCell by measuring at least one reference signal transmitted from the PCell on the frequency band. For example, the UE 706 may measure the first reference signal 724 (e.g., referred to as Reference Signal_1 724 in FIG. 7) transmitted on E-UTRA frequency band B1 and/or E-UTRA frequency band B3. In one example, the measurement of the first reference signal 724 may be expressed as a reference signal received power (RSRP) value. The UE 706 may measure a frequency band associated with the SCell by measuring at least one reference signal transmitted from the SCell on the frequency band. For example, the UE 706 may measure the second reference signal 726 (e.g., referred to as Reference Signal_2 726 in FIG. 7) transmitted on NR frequency band n257 and/or NR frequency band n260. In one example, the measurement of the second reference signal 726 may be expressed as an RSRP value.

Therefore, the UE 706 may prioritize frequency band measurements based on the frequency band combinations indicated to the network 701 (e.g., indicated to the first base station 702) in the UE capability information message 716. In some aspects of the disclosure, anchor frequency bands of PCells may be given the highest priority, while frequency bands associated with SCells supported along with the anchor frequency bands may be given a lower priority. These aspects may allow the UE 706 to measure frequency bands which have been indicated to the network 701 (e.g., advertised to the first base station 702 as being supported via the UE capability information message 716) and which may actually be supported at the UE 706, while avoiding measurements on frequency bands that may not actually be supported at the UE 706.

For example, with respect to the first NSA frequency band combination (e.g., B1+n257), the UE-L1 710 may measure the E-UTRA frequency band B1 associated with a PCell (e.g., the first base station 702) and may determine whether the measurement is greater than or equal to a threshold. If the measurement of the E-UTRA frequency band B1 is greater than or equal to the threshold, the UE-L1 710 may proceed to measure the NR frequency band n257 of the SCell (e.g., the second base station 704). It should be noted that if the measurement of the E-UTRA frequency band B1 is not greater than or equal to the threshold, the UE-L1 710 may not measure the NR frequency band n257.

As another example, with respect to the second NSA frequency band combination (e.g., B3+n260), the UE-L1 710 may measure the E-UTRA frequency band B3 associated with a PCell (e.g., the first base station 702) and may determine whether the measurement is greater than or equal to a threshold. If the measurement of the E-UTRA frequency band B3 is greater than or greater to the threshold, the UE-L1 710 may proceed to measure the NR frequency band n260 of the SCell (e.g., the second base station 704). It should be noted that if the measurement of the E-UTRA frequency band B3 is not greater than or equal to the threshold, the UE-L1 710 may not measure the NR frequency band n260.

The UE-L1 710 may provide a measurement information message 728 to the UE-RRC 708 including the measurements (e.g., RSRP measurements) obtained at 722. The UE 706 may transmit a UE measurement report 730 including the measurements performed at 722 to the first base station 702.

Therefore, the aspects described herein may enable the UE 706 to reduce power consumption by avoiding measurements of frequency bands that may not actually be supported at the UE 706 (e.g., frequency bands of SCells). By avoiding such frequency band measurements, the UE 706 may reduce the number of frequency band measurements included in the UE measurement report 730. Accordingly, the aspects described herein may reduce the signaling overhead of the UE measurement report 730.

It should be understood that the described aspects may apply to network architectures and UE configurations different than those in the specific examples set forth herein. Therefore, in some examples, the network 701 may not support 5G NR in the NSA configuration as described with reference to the network 500 of FIG. 5, but instead may support NR-NR dual connectivity (also referred to simply as NR-DC) and/or NR carrier aggregation (NR-CA).

In some examples, if the network 701 is configured to support NR-DC, the first and second base stations 702, 704 may each be a gNB supporting NR. In other words, the first and second base stations 702, 704 may support the same RAT. In these examples, the UE 706 may simultaneously maintain a connection to the first base station 702 supporting NR (e.g., a first gNB acting as a PCell) and a connection to the second base station 704 supporting NR (e.g., a second gNB acting as an SCell). In this scenario, the first base station 702 may be referred to as an anchor base station (also referred to as an anchor node or master node) and the NR frequency bands supported at the first base station 702 may be referred to as anchor frequency bands. For example, the first base station 702 may be coupled to a 5GC via a first interface (e.g., an NG interface), and the second base station 704 may be coupled with the first base station 702 via a second interface (e.g., an Xn interface).

Therefore, in one example, the previously described list of supported frequency band combinations 720 may include at least one frequency band combination including an NR frequency band supported at the first base station 702 and an NR frequency band supported at the second base station 704. Thus, at 722 in FIG. 7, the UE-L1 710 may measure an NR frequency band associated with the first base station 702 (e.g., the PCell) and may determine whether the measurement is greater than or equal to a threshold. If the measurement of the NR frequency band associated with the first base station 702 is greater than or equal to the threshold, the UE-L1 710 may proceed to measure the NR frequency band associated with the second base station 704 (e.g., the SCell). It should be noted that if the measurement of the NR frequency band associated with the first base station 702 is not greater than or equal to the threshold, the UE-L1 710 may not measure the NR frequency band associated with the second base station 704 (e.g., the SCell).

Figure 8:
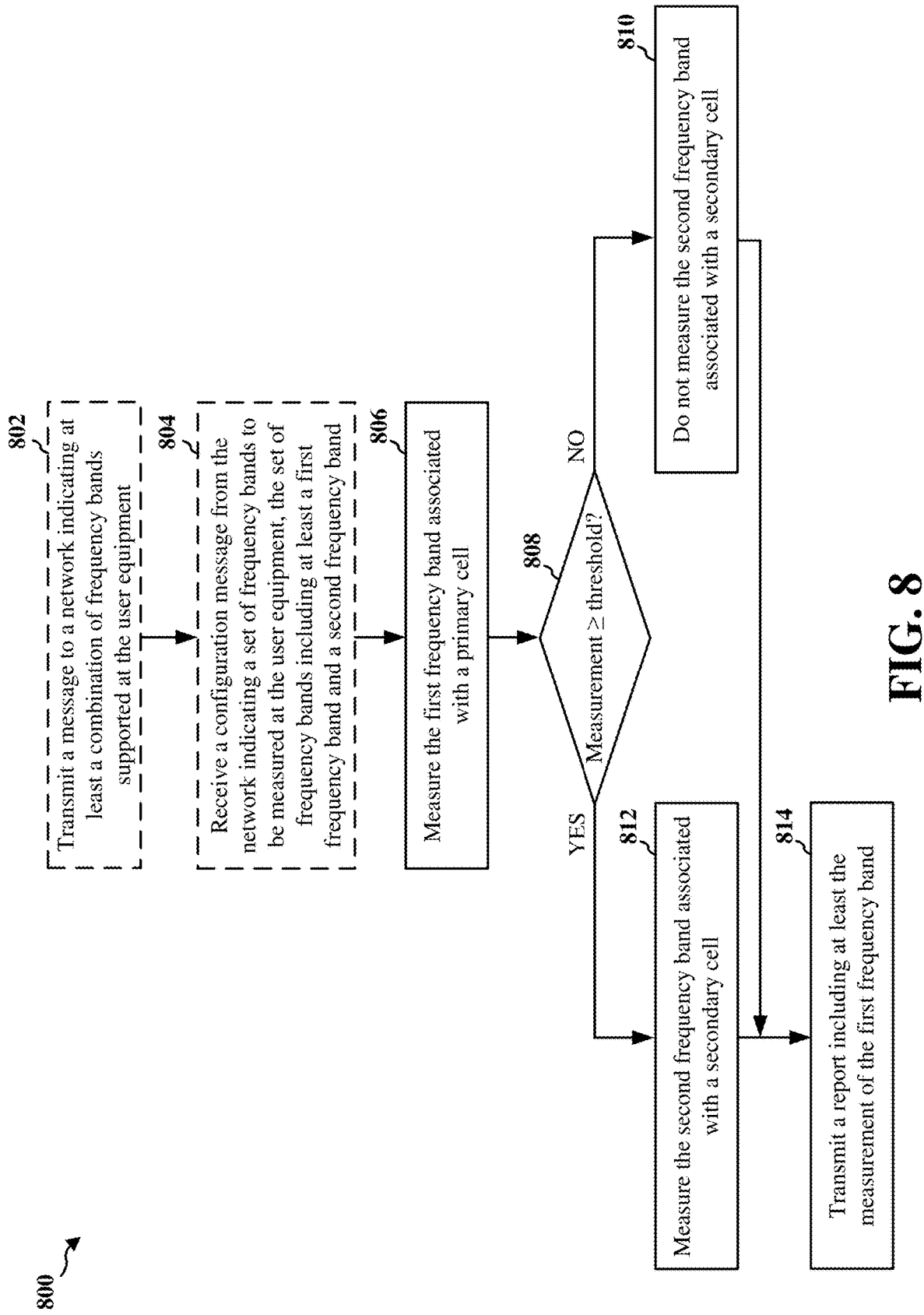
FIG. 8 is a flowchart of a method of wireless communication.

FIG. 8 is a flowchart 800 of a method of wireless communication. The method may be performed by a UE (e.g., the UE 104, 706; the apparatus 902/902'; the processing system 1014, which may include the memory 360 and which may be the entire UE 104, 706 or a component of the UE 104, 706, such as the TX processor 368, the RX processor 356, and/or the controller/processor 359). It should be noted that the operations indicated with dashed lines in FIG. 8 represent optional operations. The UE may support a combination of frequency bands including a first frequency band associated with a primary cell (PCell) and at least a second frequency band associated with a secondary cell (SCell).

At 802, the UE transmits a message to a network indicating at least the combination of frequency bands supported at the UE. In some examples, the message may be the UE capability information message 716 described with reference to FIG. 7. In one example, the combination of frequency bands supported at the UE may include an NSA frequency band combination including a first frequency band B1 and a second frequency band n257.

At 804, the UE receives a configuration message from the network indicating a set of frequency bands to be measured at the UE, the set of frequency bands including at least the first frequency band and the second frequency band. For example, the set of frequency bands may include frequency bands B1, B3, n257, n260. In some examples, the configuration message may be the measurement configuration message 718 described with reference to FIG. 7.

At 806, the UE measures the first frequency band associated with the primary cell. For example, the UE may measure a reference signal (e.g., the first reference signal 724) from the primary cell (e.g., the first base station 702 acting as a primary cell) on the first frequency band (e.g., anchor band B1). In some examples, the measurement of the first frequency band may be an RSRP of the reference signal on the first frequency band.

At 808, the UE determines whether the measurement of the first frequency band associated with the primary cell is greater than or equal to a threshold. The threshold may be set by the network (e.g., the first base station 702 in the network 701). In some aspects, the UE may compare the measurement (e.g., an RSRP value) of the first frequency band (e.g., anchor band B1) associated with the primary cell to the threshold. In some examples, the UE may be considered out of coverage from the first frequency band when the measurement of the first frequency band is below the threshold.

At 810, if the measurement of the first frequency band associated with the primary cell is not greater than or equal to the threshold, the UE does not measure the second frequency band associated with the secondary cell. For example, the UE may not measure any reference signals (e.g., the UE may not measure the second reference signal 726) from the secondary cell (e.g., the second base station 704 acting as a secondary cell) on the second frequency band (e.g., NR frequency band n257).

At 812, if the measurement of the first frequency band associated with the primary cell is greater than or equal to the threshold, the UE measures the second frequency band associated with the secondary cell. For example, the UE may measure a reference signal (e.g., the second reference signal 726) from the secondary cell (e.g., the second base station 704 acting as a secondary cell) on the second frequency band (e.g., NR frequency band n257). In some examples, the measurement of the second frequency band may be an RSRP of the reference signal on the second frequency band.

Finally, at 814, the UE transmits a report including at least the measurement of the first frequency band (e.g., the anchor band B1). In some examples, the report may be the UE measurement report 730 previously described with reference to FIG. 7.

Figure 9:
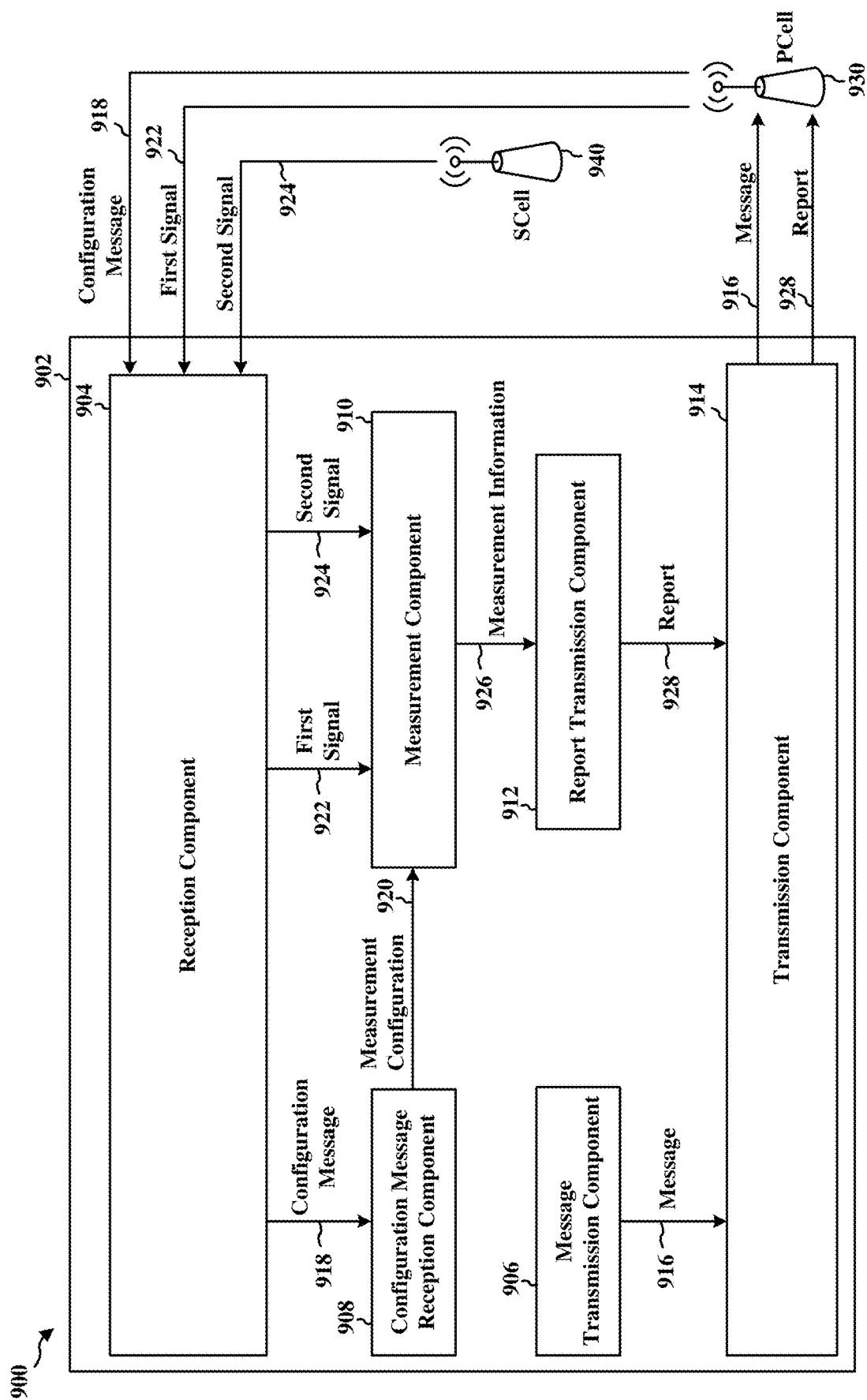
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE.

The apparatus includes a reception component 904 that receives a configuration message 918 from a first base station 930, receives a first signal 922 from the first base station 930, and/or receives a second signal 924 from a second base station 940. In some examples, the first base station 930 may be a PCell and the second base station 940 may be an SCell. In some examples, the configuration message 918 may be the measurement configuration message 718 described with reference to FIG. 7. The first signal 922 may be a first reference signal (e.g., the first reference signal 724) or other suitable signal that enables the apparatus 902 to obtain a measurement on a first frequency band of the first base station 930. The second signal 924 may be a second reference signal (e.g., the second reference signal 726) or other suitable signal that enables the apparatus 902 to obtain a measurement on a second frequency band of the second base station 940.

The apparatus further includes a message transmission component 906 that transmits a message 916 to a network (e.g., the first base station 930) indicating at least the combination of frequency bands supported at the apparatus 902. In some examples, the combination of frequency bands supported at the apparatus 902 may refer to a pair of frequency bands that the hardware of the apparatus 902 is able to support.

The apparatus further includes a configuration message reception component 908 that receives the configuration message 918. The configuration message reception component 908 may provide a measurement configuration included in the configuration message 918 to the measurement component 910 via the communication 920.

The apparatus further includes a measurement component 910 that measures the first frequency band associated with the primary cell (e.g., the first base station 930) and measures the second frequency band associated with the secondary cell (e.g., the second base station 940) if the measurement of the first frequency band is greater than or equal to a threshold. In some aspects, the measurement component 910 does not measure the second frequency band when the measurement of the first frequency band is below the threshold. The measurement component 910 may provide measurement information 926 including at least one measurement of the first frequency band (e.g., an RSRP of the first signal 922 on the first frequency band) and/or at least one measurement of the second frequency band (e.g., an RSRP of the second signal 924 on the second frequency band).

In some examples, the first frequency band is associated with a first radio access technology (RAT), and the second frequency band is associated with the first RAT or a second RAT different from the first RAT. For example, the first base station 930 may support a first RAT, and the second base station 940 may support the first RAT or a second RAT different from the first RAT.

The apparatus further includes a report transmission component 912 that transmits a report 928 (e.g., via the transmission component 914) including at least the measurement of the first frequency band. In some examples, if the measurement of the first frequency band associated with the primary cell (e.g., the first base station 930) is greater than or equal to the threshold and the apparatus measures the second frequency band associated with the secondary cell (e.g., the second base station 940), the report may include the measurement of the first frequency band and the measurement of the second frequency band.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
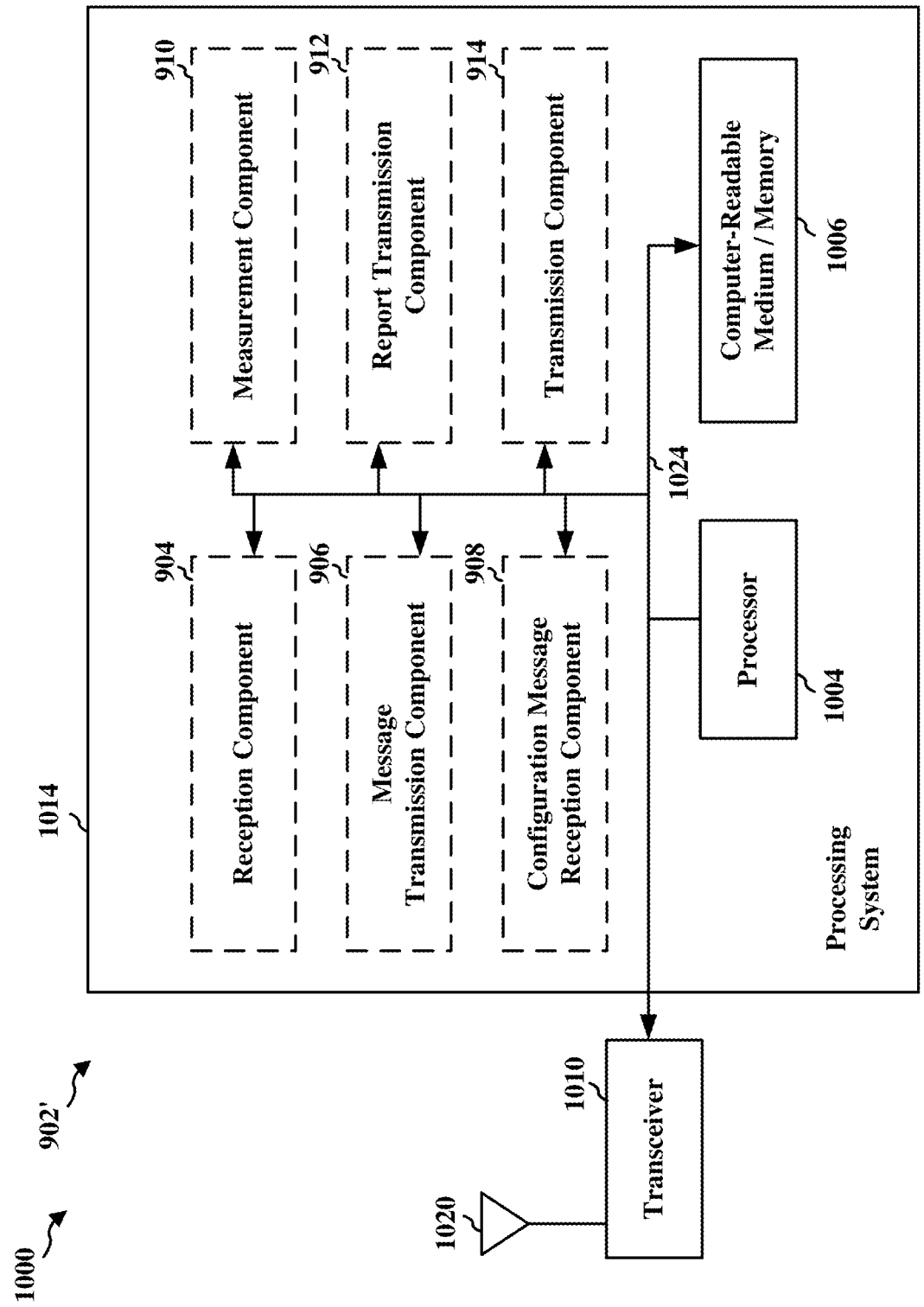
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 914, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for transmitting a message to a network indicating at least the combination of frequency bands supported at the apparatus, means for receiving a configuration message from the network indicating a set of frequency bands to be measured at the apparatus, the set of frequency bands including at least the first frequency band and the second frequency band, means for measuring the first frequency band associated with a primary cell, means for measuring a second frequency band associated with a secondary cell if the measurement of the first frequency band is greater than or equal to a threshold, means for transmitting a report including at least the measurement of the first frequency band. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following provides an overview of aspects of the present disclosure:

Aspect 1: A method of wireless communication for a user equipment supporting a combination of frequency bands including a first frequency band associated with a primary cell and at least a second frequency band associated with a secondary cell, comprising: measuring the first frequency band associated with the primary cell; measuring the second frequency band associated with the secondary cell if the measurement of the first frequency band is greater than or equal to a threshold; and transmitting a report including at least the measurement of the first frequency band.

Aspect 2: The method of aspect 1, wherein the second frequency band is not measured when the measurement of the first frequency band is below the threshold.

Aspect 3: The method of any of aspects 1 or 2, wherein measurement information for the second frequency band is omitted from the report when the measurement of the first frequency band is below the threshold.

Aspect 4: The method of any of aspects 1 through 3, wherein the first frequency band is associated with a first radio access technology (RAT), and the second frequency band is associated with the first RAT or a second RAT different from the first RAT.

Aspect 5: The method of any of aspects 1 through 4, further comprising: transmitting a message to a base station indicating at least the combination of frequency bands supported at the user equipment; and receiving a configuration message from the base station indicating a set of frequency bands to be measured at the user equipment, the set of frequency bands including at least the first frequency band and the second frequency band, wherein the second frequency band is not measured when the measurement of the first frequency band is below the threshold.

Aspect 6: The method of any of aspects 1 through 5, wherein the user equipment is out of coverage from the first frequency band when the measurement of the first frequency band is below the threshold.

Aspect 7: An apparatus for wireless communication, comprising: a memory; and at least one processor coupled to the memory and configured to perform a method of any one of aspects 1 through 6.

Aspect 8: An apparatus for wireless communication comprising at least one means for performing a method of any one of aspects 1 through 6.

Aspect 9: A computer-readable medium storing computer executable code, the code when executed by a processor cause the processor to perform a method of any one of aspects 1 through 6.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment supporting a combination of frequency bands including a first frequency band associated with a primary cell and at least a second frequency band associated with a secondary cell, comprising:
    measuring the first frequency band associated with the primary cell;
    measuring the second frequency band associated with the secondary cell if the measurement of the first frequency band is greater than or equal to a threshold, wherein the second frequency band is not measured when the measurement of the first frequency band is below the threshold; and
    transmitting a report including at least the measurement of the first frequency band.

2. The method of claim 1, wherein measurement information for the second frequency band is omitted from the report when the measurement of the first frequency band is below the threshold.

3. The method of claim 1, wherein the first frequency band is associated with a first radio access technology (RAT), and the second frequency band is associated with the first RAT or a second RAT different from the first RAT.

4. The method of claim 1, further comprising:
    transmitting a message to a base station indicating at least the combination of frequency bands supported at the user equipment; and
    receiving a configuration message from the base station indicating a set of frequency bands to be measured at the user equipment, the set of frequency bands including at least the first frequency band and the second frequency band.

5. The method of claim 1, wherein the user equipment is out of coverage from the first frequency band when the measurement of the first frequency band is below the threshold.

6. An apparatus for wireless communication, the apparatus supporting a combination of frequency bands including a first frequency band associated with a primary cell and at least a second frequency band associated with a secondary cell, comprising:
    means for measuring the first frequency band associated with the primary cell;
    means for measuring the second frequency band associated with the secondary cell if a measurement of the first frequency band is greater than or equal to a threshold, wherein the means for measuring the second frequency band associated with the secondary cell is configured to not measure the second frequency band when the measurement of the first frequency band is below the threshold; and
    means for transmitting a report including at least the measurement of the first frequency band.

7. The apparatus of claim 6, wherein the means for transmitting the report is configured to omit measurement information for the second frequency band from the report when the measurement of the first frequency band is below the threshold.

8. The apparatus of claim 6, wherein the first frequency band is associated with a first radio access technology (RAT), and the second frequency band is associated with the first RAT or a second RAT different from the first RAT.

9. The apparatus of claim 6, further comprising:
    means for transmitting a message to a base station indicating at least the combination of frequency bands supported at the apparatus; and
    means for receiving a configuration message from the base station indicating a set of frequency bands to be measured at the apparatus, the set of frequency bands including at least the first frequency band and the second frequency band.

10. The apparatus of claim 6, wherein the apparatus is out of coverage from the first frequency band when the measurement of the first frequency band is below the threshold.

11. An apparatus for wireless communication, the apparatus supporting a combination of frequency bands including a first frequency band associated with a primary cell and at least a second frequency band associated with a secondary cell, comprising:
a memory; and
at least one processor coupled to the memory and configured to:
measure the first frequency band associated with the primary cell;
measure the second frequency band associated with the secondary cell if the measurement of the first frequency band is greater than or equal to a threshold, wherein the second frequency band is not measured when the measurement of the first frequency band is below the threshold; and
transmit a report including at least the measurement of the first frequency band.

12. The apparatus of claim 11, wherein the at least one processor omits measurement information for the second frequency band from the report when the measurement of the first frequency band is below the threshold.

13. The apparatus of claim 11, wherein the first frequency band is associated with a first radio access technology (RAT), and the second frequency band is associated with the first RAT or a second RAT different from the first RAT.

14. The apparatus of claim 11, wherein the at least one processor is further configured to:
transmit a message to a base station indicating at least the combination of frequency bands supported at the apparatus; and
receive a configuration message from the base station indicating a set of frequency bands to be measured at the apparatus, the set of frequency bands including at least the first frequency band and the second frequency band.

15. The apparatus of claim 11, wherein the apparatus is out of coverage from the first frequency band when the measurement of the first frequency band is below the threshold.

16. A non-transitory computer-readable medium storing computer executable code, the code when executed by a processor cause the processor to:
measure, at a user equipment, a first frequency band associated with a primary cell, wherein the user equipment supports a combination of frequency bands including the first frequency band associated with the primary cell and at least a second frequency band associated with a secondary cell;
measure the second frequency band associated with the secondary cell if the measurement of the first frequency band is greater than or equal to a threshold, wherein the second frequency band is not measured when the measurement of the first frequency band is below the threshold; and
transmit a report including at least the measurement of the first frequency band.

17. The non-transitory computer-readable medium of claim 16, wherein measurement information for the second frequency band is omitted from the report when the measurement of the first frequency band is below the threshold.

18. The non-transitory computer-readable medium of claim 16, wherein the first frequency band is associated with a first radio access technology (RAT), and the second frequency band is associated with the first RAT or a second RAT different from the first RAT.

19. The non-transitory computer-readable medium of claim 16, wherein the code further cause the processor to:
transmit a message to a base station indicating at least the combination of frequency bands supported at the user equipment; and
receive configuration message from the base station indicating a set of frequency bands to be measured at the user equipment, the set of frequency bands including at least the first frequency band and the second frequency band.

20. The non-transitory computer-readable medium of claim 16, wherein the user equipment is out of coverage from the first frequency band when the measurement of the first frequency band is below the threshold.

* * * * *